United States Patent [19]

Kato

[11] Patent Number: 4,868,701
[45] Date of Patent: Sep. 19, 1989

[54] RECORDING DISC ASSEMBLY

[75] Inventor: Yoshitake Kato, Ibaragi, Japan

[73] Assignee: Hitachi Maxell, Ltd., Osaka, Japan

[21] Appl. No.: 264,851

[22] Filed: Oct. 31, 1988

Related U.S. Application Data

[63] Continuation of Ser. No. 796,265, Nov. 8, 1985, abandoned.

[30] Foreign Application Priority Data

Nov. 10, 1984 [JP] Japan .................................. 59-235960
Nov. 10, 1984 [JP] Japan .................................. 59-235961

[51] Int. Cl.$^4$ .............................................. G11B 5/82
[52] U.S. Cl. ................................................ 360/133
[58] Field of Search .................... 360/133, 135, 98.08, 360/99.05, 99.12; 206/444; 369/282, 290

[56] References Cited

U.S. PATENT DOCUMENTS 4,590,532 5/1986 Saito .................................... 360/133
4,599,663 7/1986 Saito et al. ......................... 360/135
4,616,278 10/1986 Yamaguchi et al. ............... 360/133
4,630,156 12/1986 Saito .................................... 360/133

FOREIGN PATENT DOCUMENTS 133541 2/1985 European Pat. Off. ........... 360/133

*Primary Examiner*—John H. Wolff
*Assistant Examiner*—Matthew J. Bussan
*Attorney, Agent, or Firm*—Birch, Stewart, Kolasch & Birch

[57] ABSTRACT

In a recording disc assembly comprising a recording disc, a hub made of plastic resin material, having a pair of reference surfaces formed on the inner surface of a rotational shaft insertion hole for positioning the disc assembly in a recording device by engagement of a rotational shaft of the recording device and a supporting plate made of metal integrally formed with the hub, the supporting plate is provided with at least a stepped portion near the reference surfaces so as to assure good accuracy of the flat plane of the reference surfaces when the hub is molded.

5 Claims, 6 Drawing Sheets

RECORDING DISC ASSEMBLY

This application is a continuation of copending application Ser. No. 796,265, filed on Nov. 8, 1985 now abandoned.

BACKGROUND OF THE INVENTION

1. FIELD OF THE INVENTION

The present invention relates to a recording disc assembly having a magnetic recording disc or optical recording disc.

2. DESCRIPTION OF THE PRIOR ART

In a recording disc assembly of the above type, there is known a recording disc assembly as shown in FIG. 1, wherein 1 denotes a case made of rigid materials, such as metal or plastic resin, 2 denotes a hub made of plastic resin materials, 2' an upper hub, 3 an annular supporting plate, 4 a ring like stopper and 5 a recording medium, such as a magnetic recording disc.

Referring to FIG. 2 there is shown a top plan view of the annular supporting plate 3, wherein a through hole 3a is defined in the central portion of the plate 3 with the hub 2 secured to the central portion of the plate 3 by an outsert forming so as to cover the peripheral edge portion of the through hole 3a. A rotational shaft insertion hole 7 is defined in the central portion of the hub 3 for receiving a rotational shaft 6 of a recording device (not shown). The inner surface of the hub defining the rotational shaft insertion hole 7 is provided with two reference surfaces 2a and a resilient member 2b to bias the rotational shaft 6 toward the reference surfaces 2a.

The inner peripheral edge of the recording disc 5 is secured to the top face of the annular supporting plate 3, and the upper hub 2' is secured to the outer peripheral edge of the hub 2 by means of a ultra sonic bonding so as to cover the inner peripheral portion of the recording disc 5. A ring like stopper 4 is secured on the lower surface of the annular supporting plate 3 by means of a suitable securing means. The stopper 4 has a diameter smaller than circular opening 1a defined in the central portion of the case 1 and the outer surface of the opening 1a can contact with the inner surface of the opening 1a so that the center of the recording disc 5 can be positioned at the center of the case 1.

When the recording disc 5 is mounted on the recording device, the recording disc 5 can be mounted on a position of the recording device with the rotational shaft 6 inserted in the rotational shaft insertion hole 7. Since the rotational shaft 6 is pressed onto the reference surfaces 2a of the hub by the force of the resilient member 2b, the recording disc 5 coupled to the hub 2 through the annular supporting plate 3 can be correctly centered. As the rotational shaft 6 is rotated under such a state as mentioned above, the recording disc 5 can be rotated in the case 1, whereby when a recording head is inserted in the case 1 through a head insertion hole, the recording head can slidably contact with the recording surface of the recording disc 5, so that recording and/or reproducing on the recording disc 5 can be made.

As is apparent from the explanation mentioned above, centering of the recording disc 5 can be made by the contact between the surface of the rotational shaft 6 and the reference surfaces 2a of the hub 2. Therefore, a high degree of accuracy of the reference surfaces 2a is required. Due to such construction, the rotational shaft insertion hole 7 can not be shaped into a circle since the reference surfaces are formed as flat planes, whereby in outserting the hub 2 with the annular supporting plate 3, the accuracy of the reference surfaces 2a is decreased due to different degrees of shrinkage of the various parts of the disc arrangement at the time of molding and cooling. Accordingly, the conventional recording disc mentioned above has such a drawback that it is difficult to increase the accuracy of the reference surfaces 2a, resulting in a lowering of the accuracy of centering of the recording disc 5 when the recording disc is mounted on the recording device.

The outer diameter of the top portion of the hub 2 is relatively smaller than the diameter of the opening 1b defined in the central portion of the top face of the case 1, and the top portion of the hub 2 and the end portion of the projected portion 3b are adapted to be exposed in the opening 1b. The projection 3b can rotate around the rotational shaft 6 when the rotational shaft 6 rotates, and a magnetic sensor 8 is provided above the rotation locus of the projection 3b. The magnetic sensor 8 is provided on the recording device side and is composed of a core 8a and a signal coil 8b and there is defined a clearance between the end face of the core 8a and projection 3b.

When the recording disc 5 and annular supporting plate 3 are rotated by the rotation of the rotational shaft 6, the projection 3b formed of a magnetic material and the core 8a of the magnetic sensor 8 come close to and go away from each other and the magnetic flux of the magnetic sensor changes. Accordingly, the signal coil 8b generates a signal to detect the position of the projection 3b i.e., the standard position of the recording disc 5 by the flux change.

In the conventional recording disc arrangement, as mentioned above, although the top end face of the hub 2 and the end face of the projection 3b, embedded in the hub 2, are adapted to be flush with each other, it is difficult to be flush with each other as desired due to an error of the size of the projection 3b and a further error of the size of the hub 2, at the time of the outsert molding, shortening the length of the projection 3b, whereby the projection 3b is positioned lower than the hub 2. If the projection 3b is too short, the projection is slanted by the pressure of the flow of the molten material and the projection 3b is displaced at the time of molding. As a result, it becomes difficult for the magnetic sensor 8 to detect the projection 3b. If the projection is too long, the projection is displaced by the pressure of the mold during molding. Thus, the magnetic sensor fails in sensing the projection 3b and the standard position of the recording disc 5 can not be correctly detected.

SUMMARY OF THE INVENTION

Accordingly, an essential object of the present invention is to provide a recording disc assembly in which the drawbacks mentioned above can be effectively eliminated enabling one to improve the accuracy of the reference surface of the hub.

Another object of the present invention is to provide a recording disc assembly which can be manufactured with high accuracy preventing undesired displacement of the disc positioning detection projection during molding of the recording disc and eliminating a high bending accuracy of the projection.

In order to achieve the first object, the recording disc assembly according to the present invention is provided with a stepped portion in the supporting plate so as to absorb deformation due to shrinkage of the hub during cooling of the reference surfaces by the stepped portion, thereby to improving the accuracy of the reference surfaces.

In order to achieve the second object, the recording disc according to the present invention is provided with a recessed portion at the end face of the hub, whereby the end face of the disc positioning detection projection can be reliably projected from the end of the hub using the recess.

DETAILED DESCRIPTION OF PREFERRED EMBODIMENTS

Figure 1:
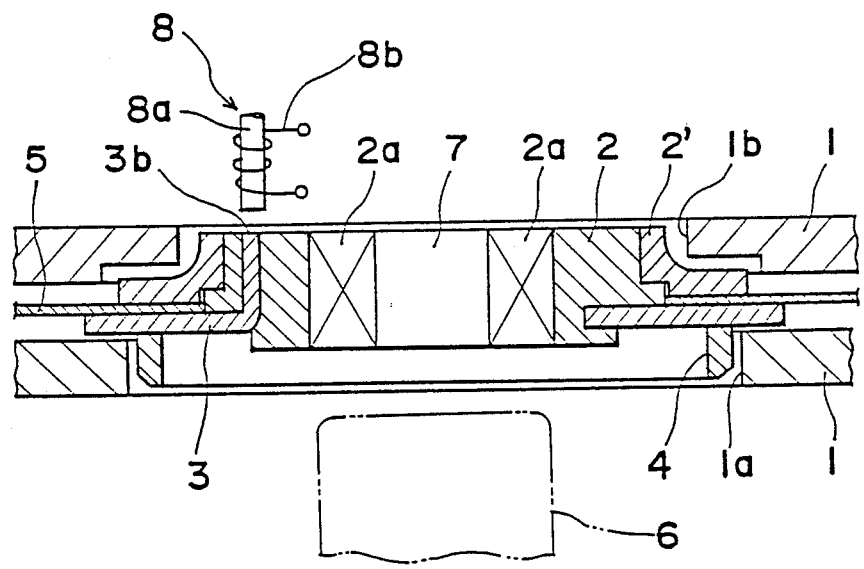
FIG. 1 is a cross sectional view showing an example of a conventional recording disc assembly.
Figure 2:
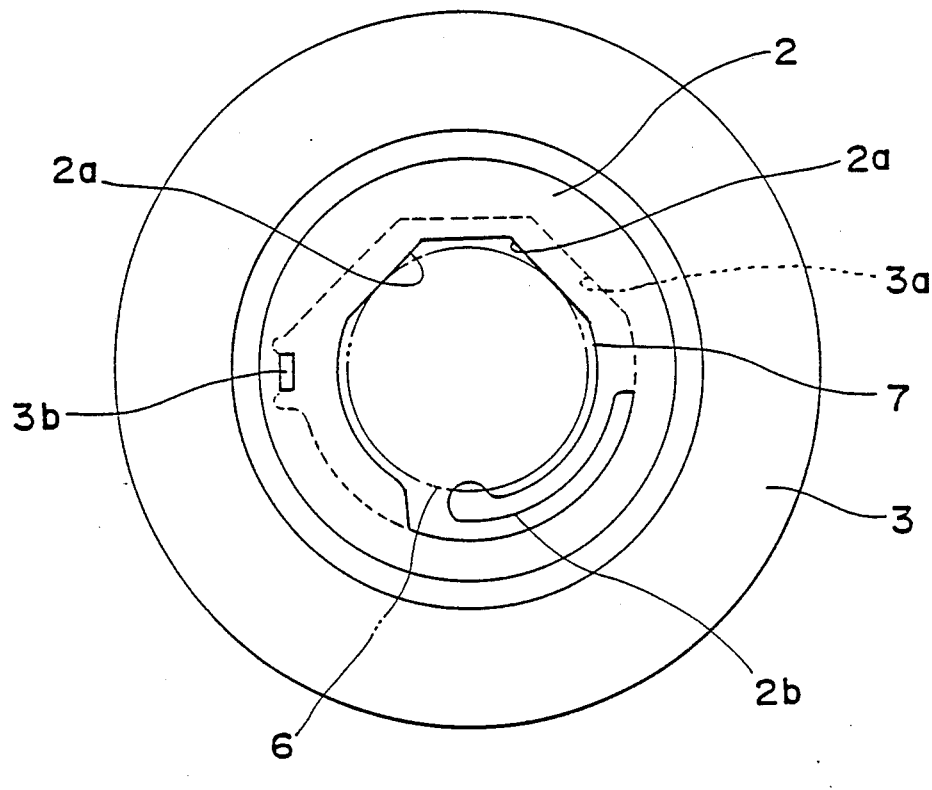
FIG. 2 is a top plan view of the recording disc assembly shown in FIG. 1.
Figure 3:
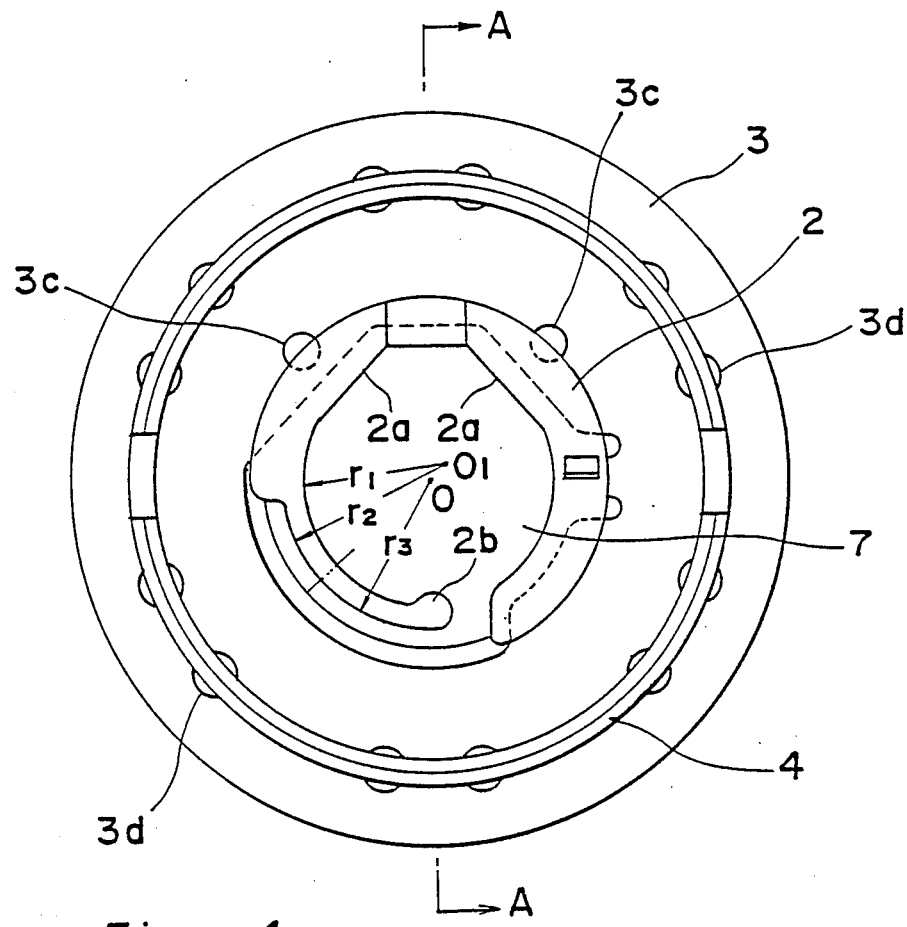
FIG. 3 is a bottom plan view of a recording disc assembly according to the present invention without a recording disc.
Figure 7:
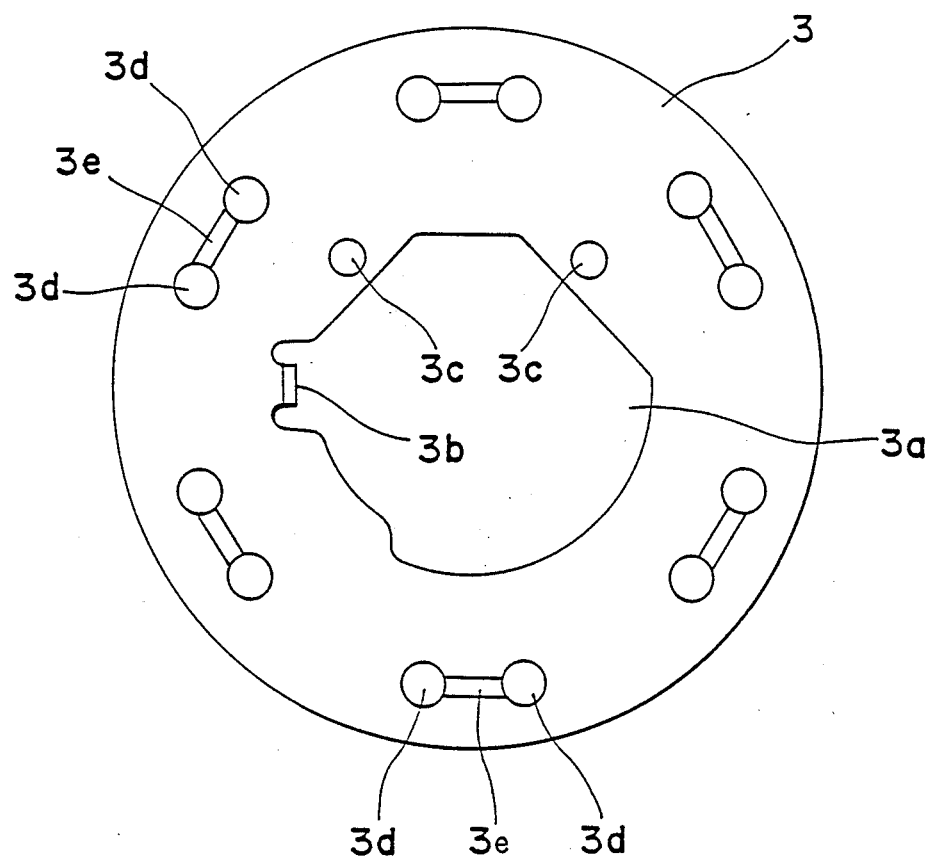
FIG. 7 is a top plan view of an annular supporting plate used in the recording disc assembly shown in FIG. 3.

Referring to FIG. 3, the annular supporting plate 3 is made of a metal with a high permeability and rigidness such as magnetic stainless steel and, as shown in FIG. 7, a projection 3b is formed in a bent shape around the part of the periphery of the through hole 3a. Two through holes 3c are defined on the annular supporting plate 3 adjacent to the through hole 3a and the reference surfaces 2a. A plurality of small bores 3d are defined on the outer peripheral portion of the annular supporting plate 3 spaced from each other by a groove of predetermined length 3e along a circle coaxial with the annular supporting plate 3. Two adjacent small bores 3d are connected by the groove 3e recessed in the form of a rectangular trough. The small bores 3d and the grooves 3e are positioned above the stopper 4 which is formed after the groove 3e is formed.

The hub 2 is made of a plastic resin material and is provided with the rotational shaft insertion hole 7 which is not a circular shape. The reference surfaces 2a are formed spaced together at a predetermined angle on the inner peripheral portion of the hub defining a part of the rotational shaft insertion hole 7. The resilient member 2b is formed extending in a canti lever manner with its intermediate portion bent in the round generally conforming to the arcuate part of the rotational shaft insertion hole 7. The inner surface of the resilient member 2b is formed along the part of a circle having a radius r1 with its center O1 displaced slightly from the center O of the annular supporting plate 3. The outer surface of the resilient member 2b between the base portion to the central portion (shown in the dotted line) is formed along the part of a circle having a radius r2 with its center positioned at O1 and the outer surface of the resilient member 2b between the central portion and the free end is formed along the part of a circle having a radius r3 centered by O.

Figure 5:
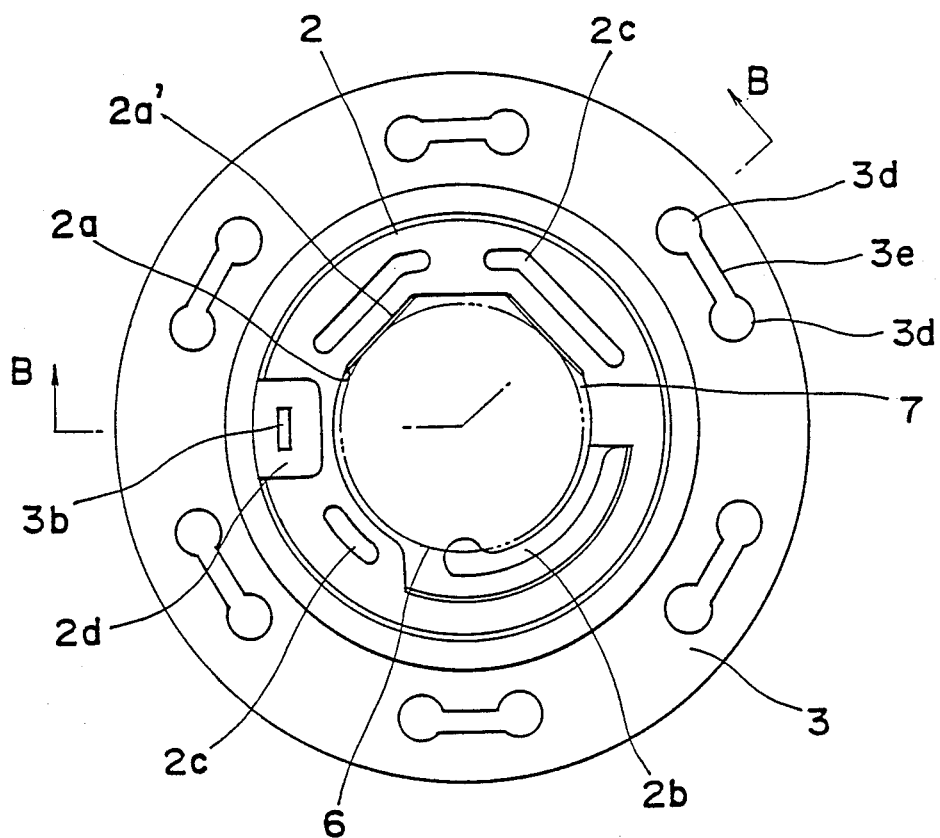
FIG. 5 is a top plan view of the recording disc shown in FIG. 3.
Figure 6:
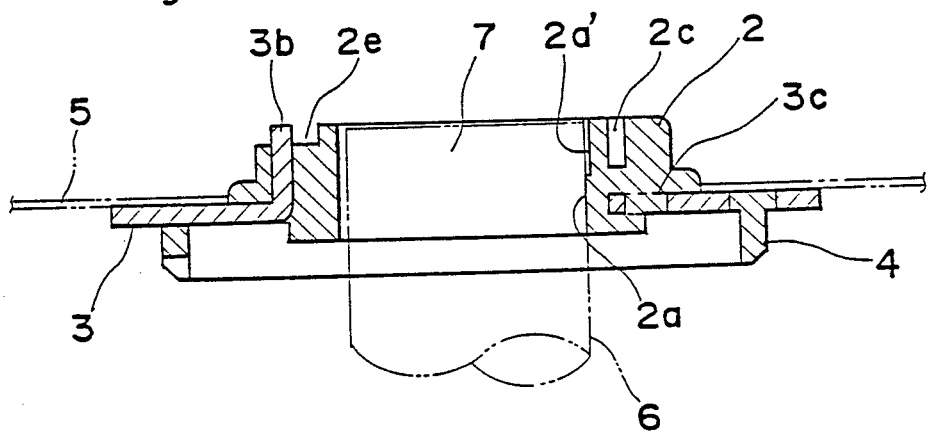
FIG. 6 is a cross sectional view taken along the line B—B in FIG. 5.

As shown in FIGS. 5 and 6, there are defined a plurality of slots 2c at the outer position of the rotational shaft insertion hole 7 for preventing occurence of drop during molding. A recess 2d is defined at a part of the outer peripheral portion of the hub 2 so as to surround the projection 3b.

Figure 4:
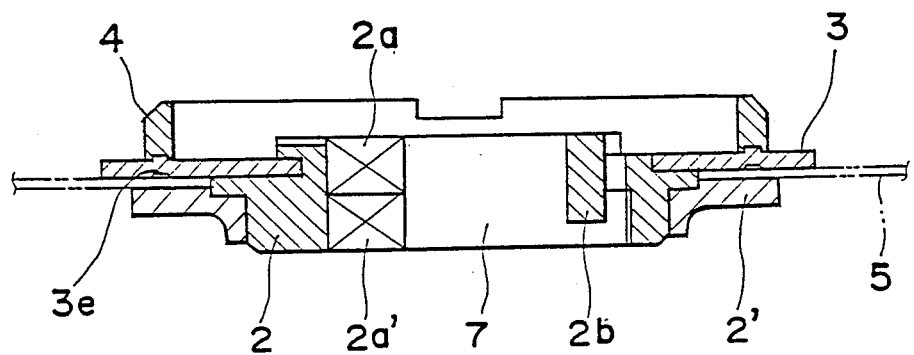
FIG. 4 is a cross sectional view taken along the lines A—A in FIG. 3.

The stopper 4 made of plastic resin material is formed projecting downwardly in a ring manner, as shown in FIGS. 3, 4 and 6, on the lower face of the annular supporting plate 3. A part of the stopper 4 is engaged in the small bores 3d and the grooves 3e so that the stopper 4 can be secured to the annular supporting plate 3.

The process of making an assembly of the annular supporting plate 3, hub 2 and stopper 4 by outsert molding is explained hereinafter.

The annular supporting plate 3 is set in a mold (not shown) and molten plastic resin is injected into the cavity of the mold by an injection machine (not show). In the process, the projection 3b is engaged in a positioning recess (not shown) having a relatively large depth so that the relative position between the mold and the annular supporting plate 3 can be decided. The injected plastic resin material is filled respectively in the periphery of the through hles 3a and the small bores 3d of the annular supporting plate 3, then they are cooled in the subsequent cooling process, thereby the hub 2 and the stopper 4 are formed. The shrink deformation of the hub 2 is corrected by the slots 2c for preventing drop. On the other hand, the plastic resin material filled in the upper portion and the lower portion of the respective peripheral portions of the respective through holes 3c are coupled together, so that the shrinkage of the plastic resin materials near the through holes 3c in the inner direction during cooling can be suppressed, whereby the close adhesion between the part of hub 2 near the through hole 3c and the annular supporting plate 3 becomes strong, resulting in assuring a high accuracy of the reference surfaces 2a compared with the other parts. In addition, in the preferred embodiment, since there is formed the stepped surfaces 2a' in the upper portion of the reference surfaces 2a, the amount of the area of the reference surface 2a to receive the rotational shaft 6 can be decreased, so that the accuracy of both of the reference surfaces 2a can be kept high.

On the other hand, the plastic resin material filled in the small bores 3d of the bottom side of the annular supporting plate 3 in the form of a ring can be coupled with the plastic resin material filled in the grooves 3e on the top side of the annular supporting plate 3 and cooled, whereby the stopper 4 can be molded coupled strongly with the annular supporting plate 3 by the outsert method. The assembly formed in the manner as mentioned above is fitted with the recording disc 5 on the top and outer part of the annular supporting plate 3 in the subsequent process with the upper hub 2' secured to the outer periphery of the hub 2 so as to cover the inner peripheral part of the recording disc 5, whereby the recording disc assembly can be formed. The recording disc assembly is rotatably enclosed in the case 1, so that a recording disc cartridge is completed. In the recording disc assembly according to the present invention, since the end portion of the projection 3b of the circular supporting plate 3 can be exposed in the recess 2d of the hub 2 during the inspection process of the components, the relative position between the hub 2 and the projection can be examined and checked from the outside. When the recording disc 5 is rotated in the recording device, since the end face of the projection 3b passes close to and then away from the magnetic sensor (not shown), a signal is provided corresponding to the change of the permeability so as to detect the standard position of the recording disc 5.

In the embodiment described above, the material of the circular supporting plate may be made by anti-magnetic materials.

Figure 8:
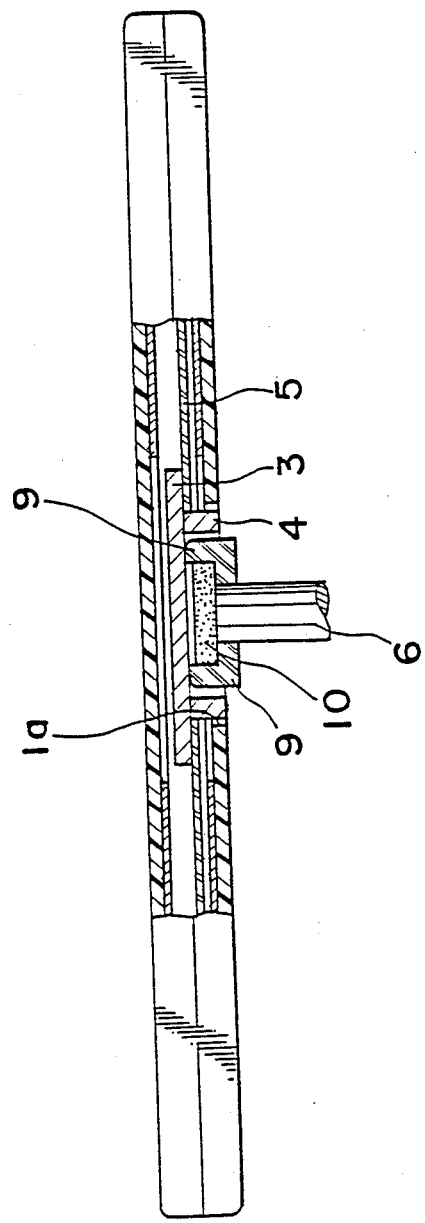
FIG. 8 is another embodiment of a recording disc assembly of the present invention with a recording device shown.

FIG. 8 shows one example of the stepped portion by the raised portion as mentioned above.

As shown in FIG. 8, the recording disc 5 is rotatably enclosed in the case 1. The disc assembly is formed by the magnetic recording disc 5, the circular supporting plate 3 made of a magnetic plate such as magnetic stainless steel plate to which the inner peripheral portion of the recording disc 5 is secured and the stopper 4 formed by the outsert method below the circular supporting plate 3.

Figure 9:
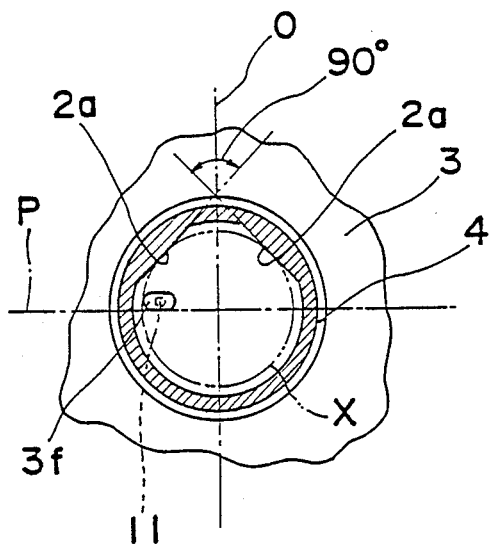
FIG. 9 is a partial plan view of a stopper used in the embodiment shown in FIG. 8.

As shown in FIG. 9, the stopper 4 is shaped in a ring, and the reference surfaces 2a are formed in a V character shape. The reference surfaces 2a are formed symmetrical relative to the center line O on one side of the center line P perpendicular to the center line O. The reference surfaces 2a are formed along the tangent lines of an imaginary circle X which has a diameter equal to the diameter of a reception surface 9 of the rotational shaft 6. The angle between two reference surfaces 2a is defined between 45° to 120°.

Figure 10:
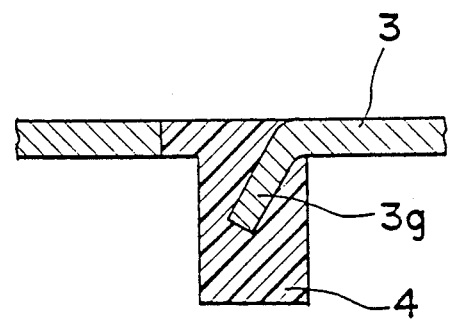
FIG. 10 is a cross sectional view of the stopper shown in FIG. 9.

As shown in FIG. 10, a plurality of raised chips 3g are formed in the circular supporting plate 3 disposed in the circumferential direction by punching method and the stopper 4 is integrally formed so that the raised chips 3g are embedded in the stopper 4 by the outsert method, whereby the circular supporting plate 3 and the stopper 4 are coupled in a reinforced manner. In particular the raised chips 3g are formed close to the reference surfaces 2a to prevent the shrinkage of the reference surfaces 2a of the plastic resin material during the cooling.

As shown in FIG. 9, the rotational shaft insertion hole 3f is preliminarily formed inside of the portion of the circular supporting plate 3 in which the stopper 4 is formed. The rotational shaft insertion hole 3f is defined elongated along the center line P so as to receive a drive pin 12 of the rotational shaft 6.

Figure 11:
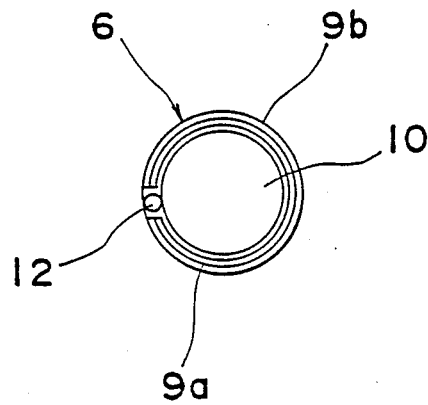
FIG. 11 is a top plan view showing a rotational shaft used in the recording device.
Figure 12:
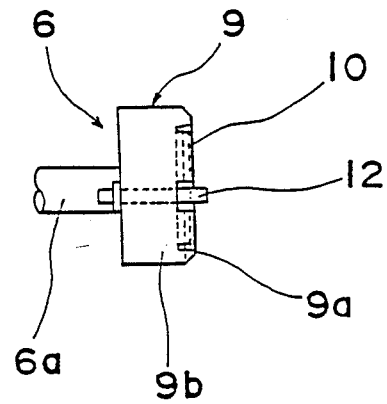
FIG. 12 is a side view of the rotational shaft shown in FIG. 11.

As shown in FIGS. 8, 11 and 12, the rotational shaft 6 is formed by a spindle 6a, a reception part 9 in the form of a saucer which is strictly fitted to the top end portion of the spindle 6a and a magnet 10 of a disc shape mounted in the reception part 9. As shown in FIGS. 11 and 12 a drive pin 12 is provided in the rotational shaft 6 to move in the vertical direction so as to project and retract crossing a portion of a ring shaped top surface 9a. The drive pin 12 is exerted in the projecting direction by a spring (not shown).

In the recording device, the top surface 9a which acts to position the recording disc 5 in the vertical direction is projected from the top face of the magnet 10 by 0.1 to 0.2 mm. The outer surface 9b of the reception part 9 serves to center the recording disc 5 assembly in the recording device. The outer diameter of the outer surface 9b has a diameter slightly smaller than the inner diameter of the stopper 4 i.e., the outer diameter of the outer surface 9b is equal to the imaginary circle X contacting the reference surfaces 2a.

Accordingly, as shown in FIG. 8, upon insertion of the top end portion of the rotational shaft 6 into the rotational shaft insertion hole 1a of the case 1, the circular supporting plate 3 is laid on the top face 9a of the reception part 9 by the force of the magnet 10 so that the position of the circular supporting plate 3 in the vertical direction can be limited. Also, the reference surfaces 2a of the stopper 4 can abut the top face 9a of the reception part 9, so that the recording disc assembly can be centered.

When the recording disc assembly is mounted on the reception part 9, if the drive pin 12 is not inserted in the rotational shaft insertion hole 3f of the circular supporting plate 3, the drive pin 12 is fully retracted in the reception part 9 against the force of the spring (not shown). When the drive pin 12 comes to the position of the rotational shaft insertion hole 3f of the circular supporting plate 3, the drive pin 12 can be entered in the rotational shaft insertion hole 3f, whereby the rotation force of the spindle 6a is transferred to the recording disc assembly.

In this embodiment, it is not necessary that the hole 3f of the circular supporting plate 3 be a through hole, but may be only a recess so far as the recess can engage with the drive pin 12 for rotation of the recording disc assembly.

As mentioned above, a portion of the circular supporting plate made of metal may be made of a bent chip as shown in FIG. 10. Also, the rotational shaft insertion hole is not essentially a through hole but may be a recess.

The present invention may be applied not only to a magnetic recording disc but also to an optical recording disc or the like.

It is an advantage of the present invention that the reference surface is prevented from shrinking by the provision of the stepped portion defined on the supporting plate so that the accuracy of the reference surface can be assured, thereby assuring the centering of the recording disc assembly in the recording device.

It is a further advantage of the present invention that there is defined a recess near the end face of the hub at which the end of the projection is placed, so that the hub can be made integral with the supporting plate even if the exactness of the length of the projection is rough.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A recording disc assembly comprising a cylindrically shaped hub made of a plastic resin material, said hub having a rotational shaft insertion hole with a pair of reference surfaces formed on an inner surface of said rotational shaft insertion hole for engagement of a rotational shaft, an annular metal support plate integrally formed with said hub such that said hub is coupled with an inner part of said metal support plate, said hub having formed therein at least one stepped recess portion juxtapositioned to at least one of said reference surfaces of said hub, a plurality of slots provided near said reference surfaces of said hub which slots prevent drop of plastic resin material during cooling, a plastic stopper member engaged with said metal support plate and a disc shaped recording medium formed integral with said hub.

2. The recording disc assembly according to claim 1, wherein said metal support plate is further provided with a projection surrounded by a recess defined in a peripheral portion of of said hub.

3. The recording disc assembly according to claim 2, wherein said recess defined in said peripheral portion of said hub is rectangular in shape surrounding said projection.

4. The recording disc assembly of claim 1, wherein at least one raised chip is formed in said annular metal support plate such that said at least one raised chip is embedded in said stopper.

5. The recording disc assembly according to claim 1, wherein said hub is provided with a resilient member opposing said reference surfaces for exerting said rotational shaft toward said reference surfaces.

* * * * *